Figure 1:
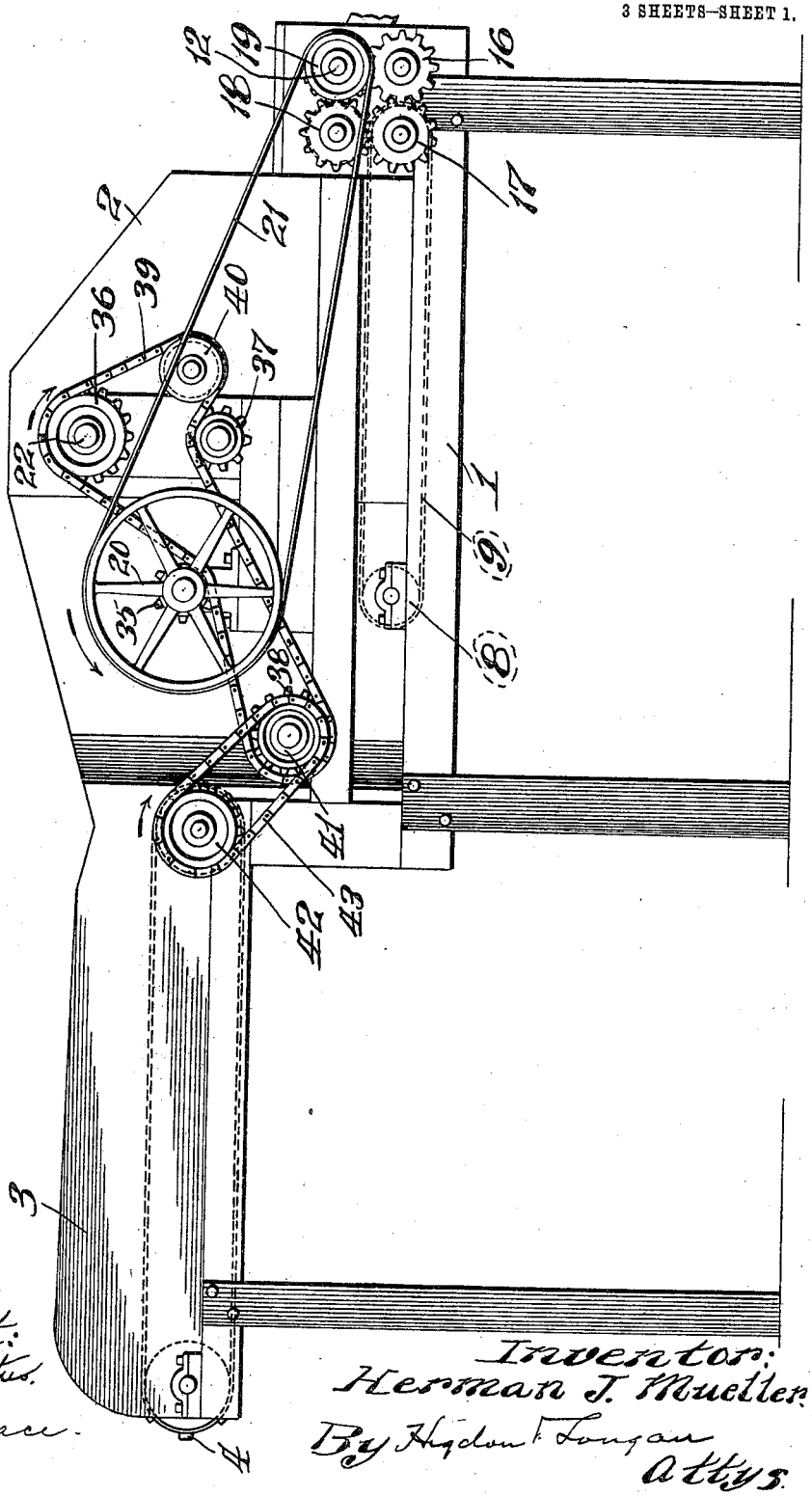

H. J. MUELLER.
SELF FEEDER FOR FEED CUTTERS.
APPLICATION FILED MAR. 30, 1910.

972,465.

Patented Oct. 11, 1910.
3 SHEETS—SHEET 1.

Attest:
H. G. Fletcher.
E. L. Wallace.

Inventor:
Herman J. Mueller,
By Hydon & Longan
Attys.

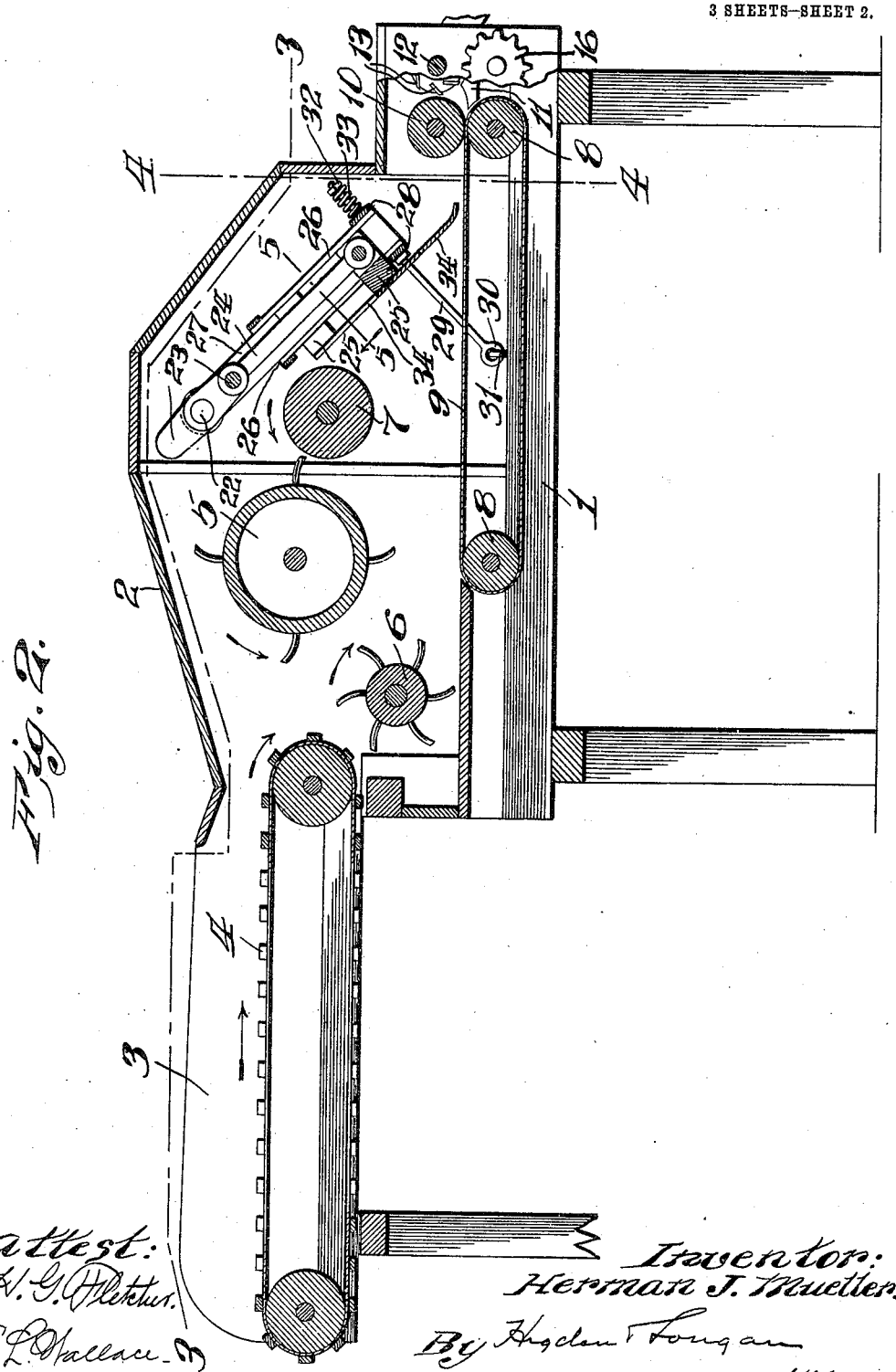

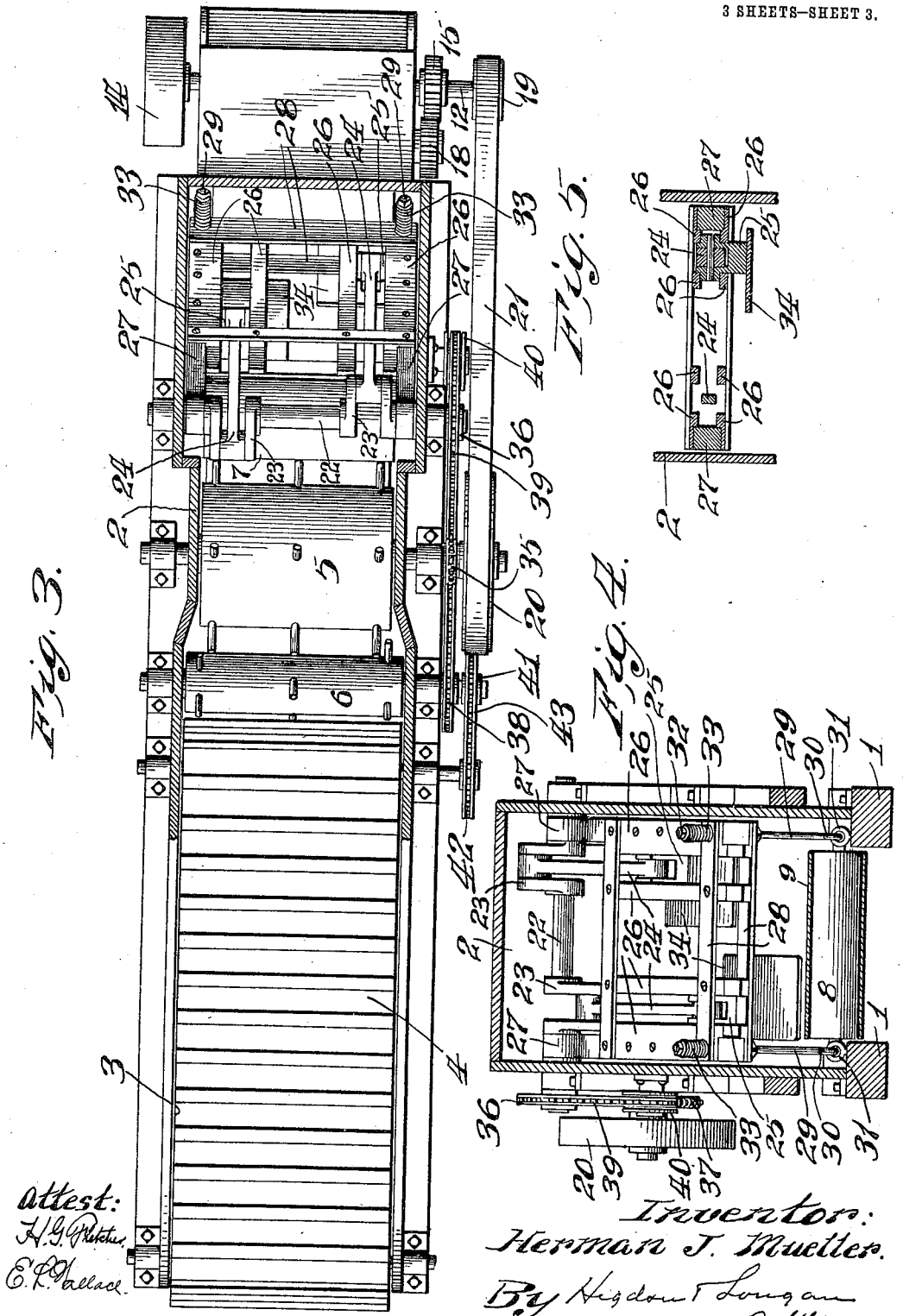

UNITED STATES PATENT OFFICE.

HERMAN J. MUELLER, OF SUGAR LOAF TOWNSHIP, ST. CLAIR COUNTY, ILLINOIS.

SELF-FEEDER FOR FEED-CUTTERS.

972,465.  Specification of Letters Patent.  Patented Oct. 11, 1910.

Application filed March 30, 1910. Serial No. 552,377.

*To all whom it may concern:*

Be it known that I, HERMAN J. MUELLER, a citizen of the United States, and resident of Sugar Loaf township, St. Clair county, Illinois, have invented certain new and useful Improvements in Self-Feeders for Feed-Cutters, of which the following is a specification containing a full, clear, and exact description, reference being had to the accompanying drawings, forming a part hereof.

My invention relates to improvements in self feeders for feed cutters, the object of my invention being to construct a machine which will automatically straighten loose hay, straw or other matter and place it in condition to be received by the rollers and carrier of an ordinary cutter immediately in advance of the cutting members.

For the above purposes my invention consists in certain novel features of construction and arrangement of parts as will be hereinafter more fully described, pointed out in the claims and illustrated by the accompanying drawings, in which:

Figure 1 is a side elevation of the complete machine showing the conveyers in dotted lines; Fig. 2 is a sectional elevation of the complete machine except for a small portion at the rear end of the machine where a portion of the gearing is shown which operates the cutting member; Fig. 3 is a sectional, plan taken on the line 3—3 of Fig. 2; Fig. 4 is a transverse, sectional elevation taken on the line 4—4 of Fig. 2; and Fig. 5 is a sectional plan taken on the line 5—5 of Fig. 2.

Referring by numerals to the accompanying drawings: 1 designates the machine frame and 2 the housing for the machine proper.

3 designates an open-topped section of the frame and arranged for travel in the part 3 of the machine is the endless conveyer 4, the top portion of which travels in a direction toward the machine as indicated by the arrow in Fig. 2.

Located within the inclosed portion of the machine are the toothed cylinders 5 and 6 which rotate toward each other and at a higher rate of speed than the speed of travel of the hay or straw from the conveyer 4.

7 designates a roller or brush wheel arranged adjacent the cylinder 5 and parallel therewith in such proximity as to prevent the carrying upward by the teeth of the cylinder of loose particles of hay or straw.

8—8 designate a pair of rollers embraced by the endless conveying belt 9.

10 designates a roller located immediately over the rearmost roller 8 and in such position relative the conveying belt 9 as to compress the layer of hay or straw carried by the belt 9.

11 designates a fixed cutting member arranged adjacent the rearmost end of the conveyer belt 9, and 12 designates a shaft arranged above the fixed cutting member upon which is carried the rotating cutting members 13.

Arranged on the left hand end of the shaft 12 is the pulley 14 to which a belt (not shown) is applied for driving the entire machine.

15 designates a gear wheel carried by the shaft 12 which meshes with the gear wheel 16, carried on a shaft arranged immediately beneath the shaft 12, and upon which the gear wheel 16 is located in position to mesh with a gear wheel 17 carried by the shaft upon which the rearmost roller 8 is carried.

For the rotation of the roller 10 there is a gear wheel 18 which meshes with the gear wheel 15.

19 designates a pulley keyed or otherwise fixed to the shaft 12 at its right hand end and 20 designates a relatively large pulley which is carried upon the shaft upon which the cylinder 5 is located.

21 designates a belt embracing the pulleys 19 and 20.

22 designates a shaft extending through the machine at a point above the roller 7 which is provided with the integral cranks 23.

Carried by each of the cranks is a link 24, which links are connected with crossheads 25 arranged for reciprocation in guides 26 which guides are supported by the guide frame members 27, the guide frame members being pivotally carried upon the shaft 22.

Extended through the end members 28 of the guide frame are the rods 29, which rods are pivotally secured to the frame 1 by the eye 30 and ring 31. The outer end of the rod 29 is threaded to receive a nut 32 which nut is designed to retain the extensile coil spring 33 embracing the rod and impinging the guide frame.

Carried by the crosshead 25 and movable therewith are the blades 34 the lowermost margins of which are curved to substantially parallel the conveyer belt 9 when at their lowermost limit of movement.

Arranged on the shaft which supports the cylinder 5 immediately inside the pulley 20 is a sprocket wheel 35.

The shaft 22, the shaft which supports the roller or brush wheel 7 and the shaft which supports the cylinder 6 are provided respectively with the sprocket wheels 36, 37 and 38 all of which are embraced by the chain 39 so that all the shafts are rotated simultaneously, there being a direction pulley 40 to hold the chain against the sprocket wheel 37.

Arranged just outside the sprocket wheel 38 is the sprocket wheel 41 and arranged upon the shaft which supports the inner end of the conveyer 4 is a sprocket wheel 42 and embracing the wheels 41 and 42 is a sprocket chain 43.

In the practical operation of the machine loose matter such as hay or straw is fed to the conveyer 4 and is carried toward the machine proper and passes between the toothed cylinders 5 and 6 which by reason of their rotating at a greater speed than the travel of the hay or straw straightens or brings all of the matter into the machine lengthwise. From the cylinders the hay or straw is carried by the belt and acted upon by the blades 34 to flatten out the matter so as to be in condition to be received by the rollers 8 and 10 immediately in advance of the cutting members.

It is obvious from such a construction of machine that all of the hay or straw is put in condition to be received by the cutting members without the aid of human hands.

I claim:

1. In a machine of the class described, a frame part of which is inclosed, an open-topped extension of the frame, a conveyer in said open-topped extension, cylinders arranged within the inclosed portion of the frame and rotatable at a speed greater than the travel of the conveyer, teeth carried by each cylinder, a frame pivoted within the inclosed portion of the machine, pressure blades carried by said pivoted frame, means for moving the blades lengthwise of the pivoted frame, a conveyer within the inclosed portion of the machine, rollers at the end of said conveyer and rotating cutting members adjacent said rollers.

2. In a machine of the class described, a frame comprising a closed portion and an open-topped portion, a conveyer within the open-topped portion, cylinders having teeth located in the inclosed portion of the frame and arranged to travel at a speed greater than the travel of said conveyer, means to prevent one of the cylinders from carrying matter upwardly within the inclosed portion of the machine, a conveyer within the inclosed portion of the machine, a pivoted frame above said last mentioned conveyer within the inclosed portion of the machine, pressure blades movable lengthwise of the pivoted frame, means for reciprocating said blades, means for limiting the movement of said pivoted frame, rollers at the end of the conveyer within the frame, and cutting members adjacent said rollers.

3. In a machine of the class described, a frame having an inclosed portion and an open-topped portion, a conveyer operating in the open-topped portion, toothed cylinders within the inclosed portion of the frame, means for rotating said cylinders at a speed greater than the travel of said conveyer, a roller adjacent one of the cylinders to prevent matter from being carried upwardly in the inclosed portion of the machine by said cylinder, a conveyer within the inclosed portion of the machine, rollers at the end of said conveyer, cutting members adjacent said rollers, a shaft having cranks extended through the inclosed portion of the machine, a frame pivotally carried by said shaft above said last mentioned conveyer, crossheads operating in said pivoted frame, pressure blades carried by said crossheads, links connecting the crossheads with said cranks and cushioning devices for limiting the movement of the pivoted frame.

In testimony whereof, I have signed my name to this specification, in presence of two subscribing witnesses.

HERMAN J. MUELLER.

Witnesses:
  E. E. LONGAN,
  E. L. WALLACE.